United States Patent [19]

Chen

[11] Patent Number: 5,271,444
[45] Date of Patent: Dec. 21, 1993

[54] NEST TIRE STRUCTURE FOR A RUN-FLAT TIRE

[76] Inventor: Long-Hsiung Chen, c/o Hung Hsing Patent Service Center, P.O. Box 55-1670, Taipei, Taiwan

[21] Appl. No.: 911,345

[22] Filed: Jul. 8, 1992

Related U.S. Application Data

[63] Continuation-in-part of Ser. No. 854,543, Mar. 18, 1992, abandoned.

[51] Int. Cl.5 .............................................. B60C 17/04
[52] U.S. Cl. ..................................... 152/520; 152/158
[58] Field of Search ................. 152/520, 516, 157, 158

[56] References Cited

U.S. PATENT DOCUMENTS

| | | | |
|---|---|---|---|
| 1,379,915 | 5/1921 | Guagliardo | 152/158 |
| 4,212,338 | 7/1980 | Tiemann | 152/520 X |
| 4,371,023 | 2/1983 | Campagna | 152/520 X |
| 4,922,981 | 5/1990 | Pompier | 152/520 X |

FOREIGN PATENT DOCUMENTS 3715368 11/1988 Fed. Rep. of Germany .
0087601 7/1980 Japan .

*Primary Examiner*—Michael W. Ball
*Assistant Examiner*—Francis J. Lorin

[57] ABSTRACT

A nest tire structure to prevent a tire from blowing out completely; the inner surface of an outer tire is mounted with a solid inner tire, of which the sectional view is in a round or oblong shape. Whenever the outer tire has a leak, the solid inner tire can separate the steel rim from becoming direct contact with the ground surface and the outer tire so as to prevent the steel rim from becoming direct contact with the ground surface and the outer tire so as to prevent the steel rim from being deformed or a car losing its balance to result in falling down, and also to let a car to run at a given short distance.

1 Claim, 3 Drawing Sheets

NEST TIRE STRUCTURE FOR A RUN-FLAT TIRE

This is a continuation-in-part of application Ser. No. 07/854,543, filed Mar. 18, 1982, now abandoned.

BACKGROUND OF THE INVENTION

The tire of a car is used for supporting the weight of a car, and for transmitting the driving power of a car from the tires to a ground surface, and also transmitting the brake force of a car. Generally, the tires may be classified into three major categories as follows:

(1) The ordinary tire: The reinforcing tread laminae thereof are arranged one over another in a slanting intersection manner before being fixed with rubber.

(2) Radial tire: The reinforcing thread laminas thereof are arranged one over another in a radial direction.

(3) Tubeless tire (high-speed tire): The inner surface of the tire is coated with an excellent air-tight synthetic rubber; the tire bead has a high air-tight lamina to closely contact with the steel rim; upon the tire being punctured, the air in the tire would not leak out immediately.

All the aforesaid three categories of tires, except the tubeless tire (high-speed tire), would leak out the air therein immediately upon being punctured; in that case, the wheel of a car will be unable to turn. A tubeless tire can delay the air leak, but it would still cause a car unable to move in case of the leak being discovered by the driver too late; in that case, the driver may drive the car forwards without care to any risk, but the steel rim of the wheel would hit the ground surface directly to cause a deformed steel rim, or to cause the car to lose its balance to result in falling down, and an accident might take place.

SUMMARY OF THE INVENTION

This invention relates to a nest tire structure for blow-out-proof; the tire structure comprises a tubeless tire with a solid inner tire, which is designed into a ring-shaped tire having a round or oblong sectional view (or other suitable shapes).

The prime object of the present invention is to provide a tire which is a blow-out-proof tire structure to prevent the steel rim of a wheel from being damaged or the car from falling down. The solid inner tire is attached to the inner surface of the outer tire; in case of the air in an outer tire leaking out completely, the solid inner tire can still have the ground surface and the outer tire separated from the steel rim at a given space so as to prevent the steel rim from being deformed as a result of hitting the ground surface, and to let a car still be able to run in a limited condition.

DETAILED DESCRIPTION

Figure 1:
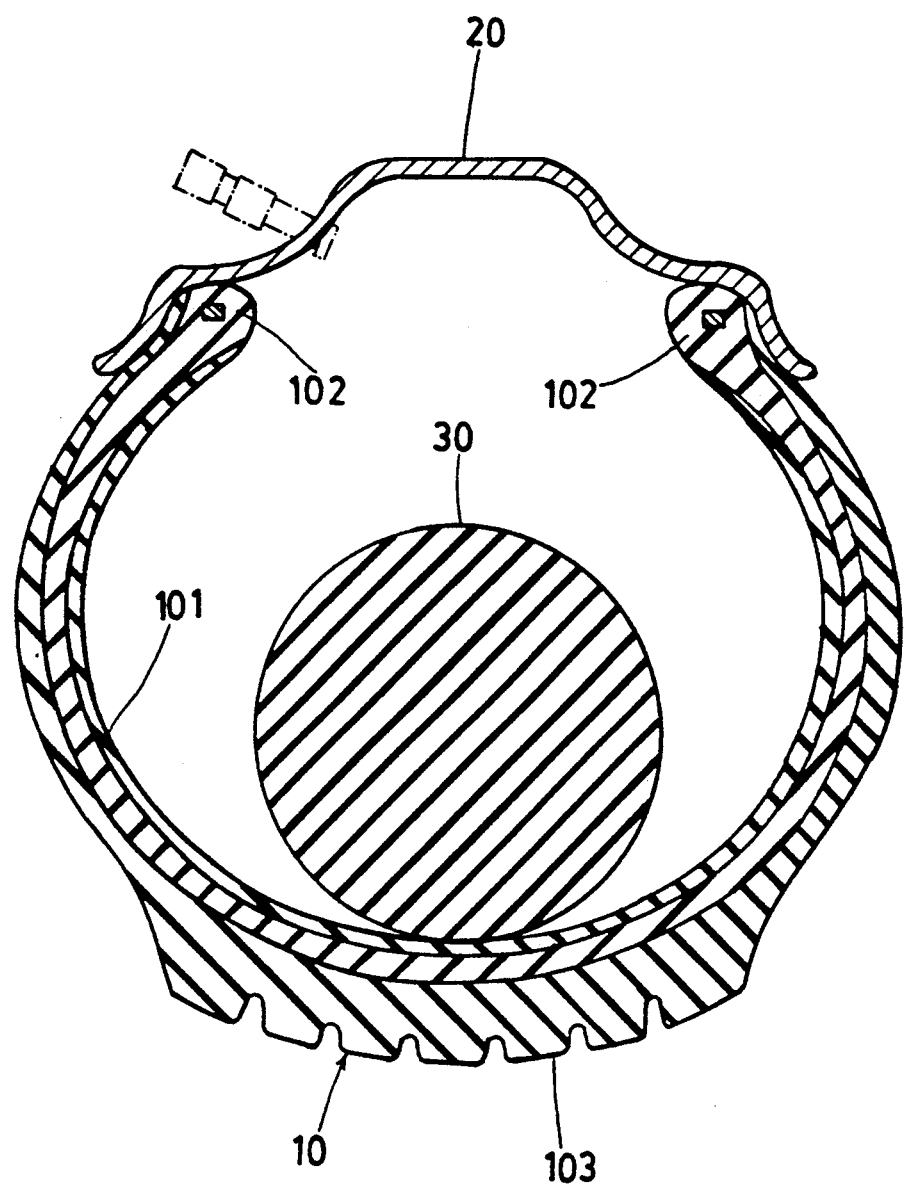
FIG. 1 is a sectional view of an embodiment according to the present invention.
Figure 2:
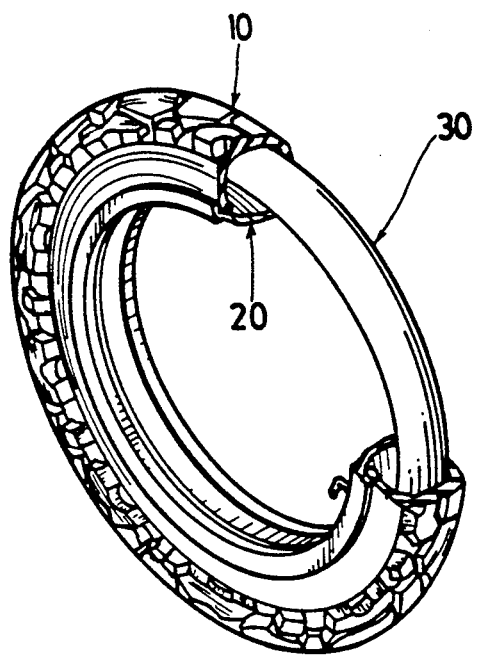
FIG. 2 is a perspective view of the present invention with a fragmental section view thereof.
Figure 3:
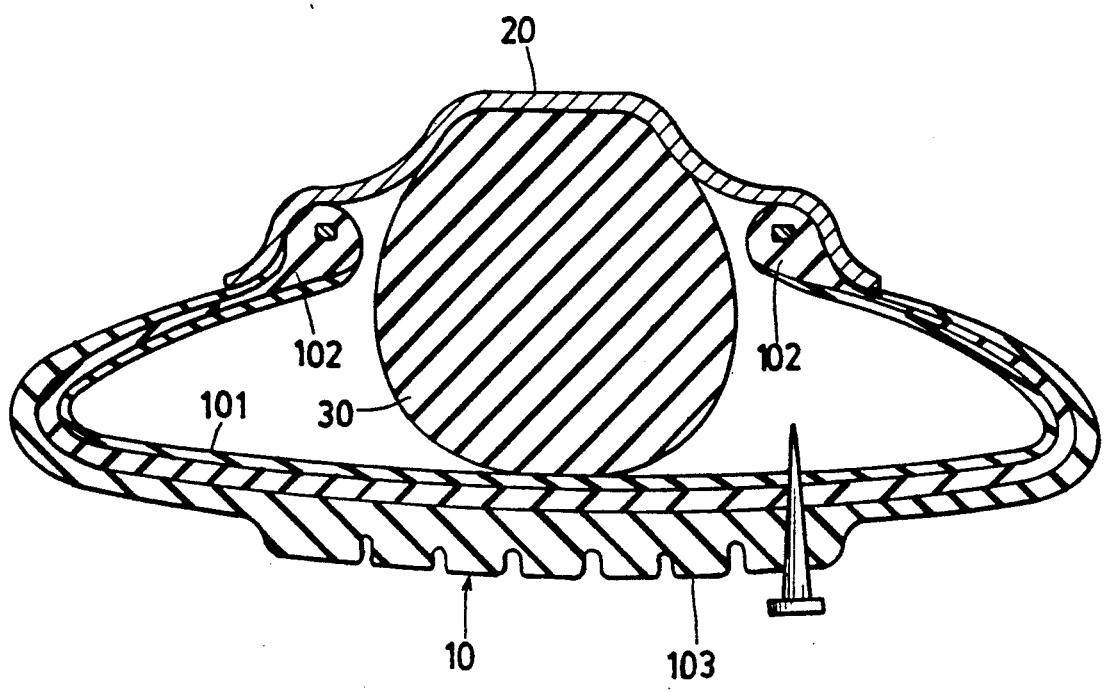
FIG. 3 is a sectional view of the present invention upon being in blow-out condition.

Referring to FIGS. 1 and 2, a basic embodiment of the present invention comprises an outer tire 10 and a steel rim 20, which are the same as that of a tubeless tire, but the inner surface 101 of the outer tire 10 is coated with a synthetic rubber to provide a better air-tight condition. The tire bead 102 portion and the steel rim 20 are in close contact each other so as to obtain a better air-tight condition. On the inner surface 101 of the outer tire 10, a solid inner tire 30 made of rubber is fixedly mounted in the center of the inner surface 101; the solid inner tire 30 can be integrally molded together with the outer tire 10, or can be glued in the outer tire 10. The solid inner tire 30 is placed in a position along a line formed with the center line of the tire tread 103, the inner surface 101 and the steel rim 20. Since the solid inner tire 30 has only a small part to be in contact with the inner wall of the outer tire 10, no impact effect can be produced to affect the car body using such a tire; further, since the solid inner tire 30 only occupies a small portion of space inside the outer tire 10, the rest portion thereof will be filled with a high-pressure air, and therefore the resilient feature, the shock-absorbing function and the strength of the tire would not be affected. In case of the tire 10 being punctured with a pointed matter, the solid inner tire 30 would be in contact with the steel rim 20 as a result of the air in the outer tire 10 being leaked to a given extent, i.e., the solid inner tire 30 would provide a support between the ground surface, the outer tire 10 and the steel rim 20; in that case, the solid inner tire 30 would be in contact with the steel rim 20 with a large area as a result of the weight of a car, i.e., to separate the outer tire 10 and the ground surface from becoming direct contact with the steel rim 20 so as to prevent the steel rim 20 from becoming direct contact with the ground surface to cause a car to fall down in the event of the ground surface not flat and smooth. The solid inner tire 30 can enable a car to move for a short distance, in case of the outer tire having a leak, so as to find a repair shop to repair the outer tire. The section view of the solid inner tire 30 might not be limited as a round shape; it might be designed into other shapes, such as an oblong or other shapes, in accordance with the model of a car and the width of a tire.

Figure 4:
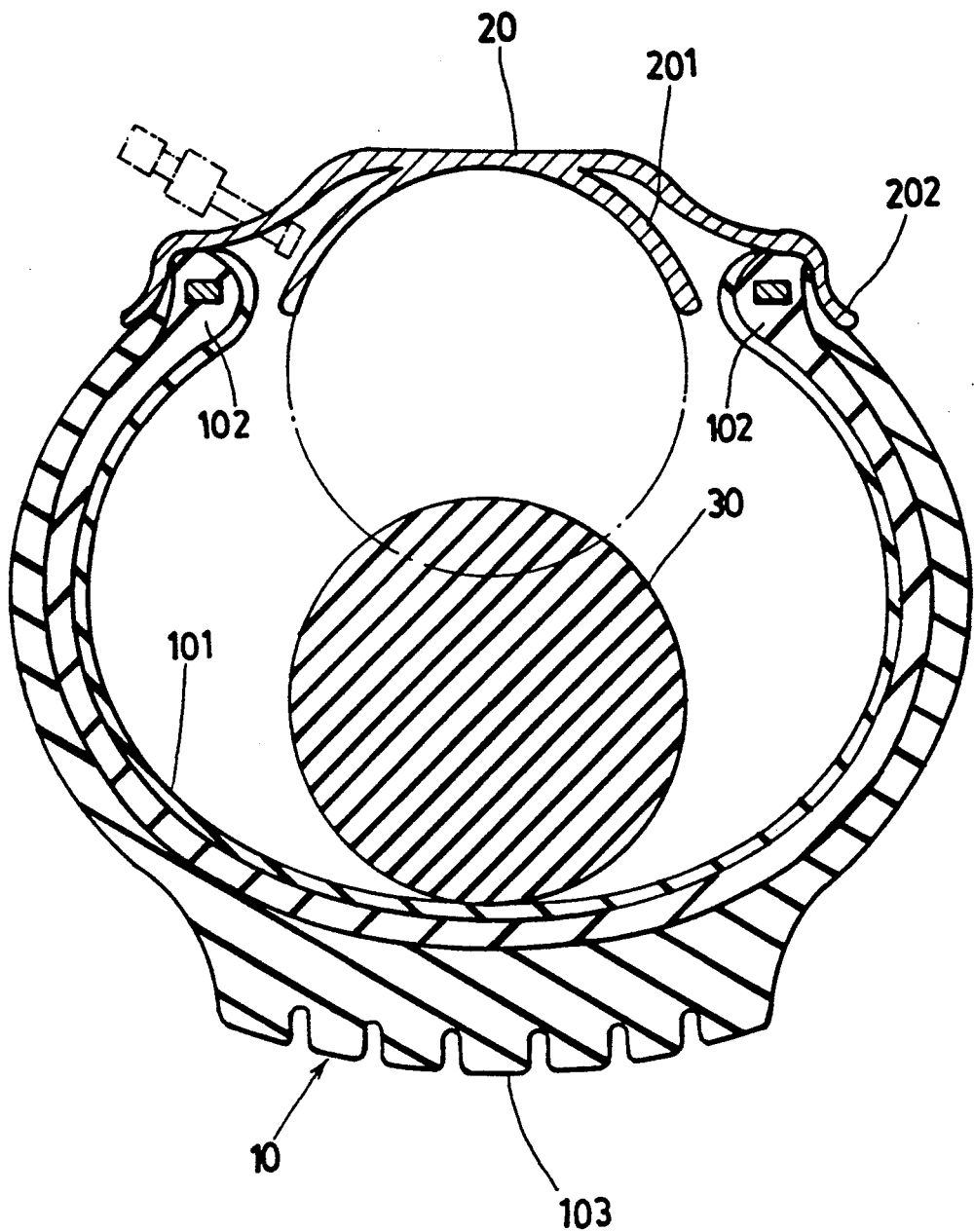
FIG. 4 is a sectional view of another embodiment according to the present invention.

Referring to FIG. 4, a modification of the present invention may be mounted around a wider steel rim; in that case, an inner tire seat 201 in a curved shaped is furnished around the outer surface of the steel rim 20. Both edges of the inner tire seat 201 are lower than either of the rim edges 202 of the steel rim 20. In case of having a flat tire, the solid inner tire 30 will be forced to rest on the inner tire seat 201 so as to prevent the solid inner tire 30 from being pressed out by the wide steel rim. The height and shape of the inner tire seat 201 may be varied in accordance with the outer tire and the steel rim. The diameter of the solid inner tire 30 might be varied, if necessary, so as to increase the air space in the tire and not to reduce its shock-absorbing function.

I claim:

1. A tire structure comprising an outer tire mounted on a steel rim and a solid inner tire; said solid inner tire fixedly secured to an inner surface of said outer tire, said solid inner tire having a cross section of circular shape; and said solid inner tire operatively separating said steel rim from said outer tire and a ground surface when said outer tire is broken and leaked; and an outer surface of said steel rim formed with a curved inner tire seat with two opposite side edges of said curved inner tire seat having a height lower than a height of two rim edges of said steel rim; said inner tire seat operatively receiving said solid inner tire therein when pressed by a car having said outer tire broken and leaked.

* * * * *